United States Patent [19]
Tomoda et al.

[11] Patent Number: 5,111,199
[45] Date of Patent: May 5, 1992

[54] POCKET-PORTABLE RADIO CODE SIGNAL TRANSMITTER FOR AUTOMOTIVE KEYLESS ENTRY SYSTEM

[75] Inventors: Takahisa Tomoda; Mikio Takeuchi; Kinichiro Nakano; Motoki Hirano, all of Kanagawa, Japan

[73] Assignee: Nissan Motor Company, Limited, Yokohama, Japan

[21] Appl. No.: 542,786

[22] Filed: Jun. 26, 1990

Related U.S. Application Data

[63] Continuation of Ser. No. 895,372, Aug. 11, 1986, abandoned.

[30] Foreign Application Priority Data

Aug. 12, 1985 [JP] Japan ................. 60-177288

[51] Int. Cl.$^5$ ............................. H04Q 1/00
[52] U.S. Cl. ................. 340/825.72; 340/825.31; 341/176; 455/128; 235/492
[58] Field of Search ......... 340/825.31, 825.34, 340/825.69, 825.72; 455/95, 100, 128; 370/112; 235/375, 487, 382, 492, 380; 361/398; 341/176

[56] References Cited

U.S. PATENT DOCUMENTS

| | | | |
|---|---|---|---|
| 3,587,051 | 6/1971 | Hovey | 340/164 |
| 3,593,816 | 7/1971 | Kazaoka | 180/113 |
| 3,633,167 | 1/1972 | Hedin | 340/164 |
| 3,641,396 | 2/1972 | Kossen et al. | 317/134 |
| 3,656,098 | 4/1972 | Duren et al. | 340/52 |
| 3,670,275 | 6/1972 | Kalliomaki et al. | 325/370 |
| 3,697,943 | 10/1972 | Andres | 340/52 |
| 3,710,316 | 1/1973 | Kromer | 340/63 |
| 3,723,967 | 3/1973 | Atkins et al. | 340/63 |
| 3,751,718 | 8/1973 | Hanchett, Jr. | 317/134 |
| 3,754,164 | 8/1973 | Zorzy | 317/134 |
| 3,754,213 | 8/1973 | Morroni et al. | 340/147 |
| 3,764,859 | 10/1973 | Wood et al. | 317/134 |
| 3,781,854 | 12/1973 | Kaufman et al. | 340/64 |
| 3,812,403 | 5/1974 | Gartner | 317/134 |
| 3,830,332 | 8/1974 | Fontaine | 180/113 |
| 3,831,065 | 8/1974 | Martin et al. | 317/134 |
| 3,859,624 | 1/1975 | Kriofsky et al. | 340/38 |
| 3,866,168 | 2/1975 | McGuirk, Jr. | 340/64 |
| 3,871,474 | 3/1975 | Tomlinson et al. | 180/112 |
| 3,878,511 | 4/1975 | Wagner | 340/147 |
| 3,885,408 | 5/1975 | Clark, Jr. | 70/278 |
| 3,891,980 | 6/1975 | Lewis et al. | 340/258 |
| 3,953,769 | 4/1976 | Sopko | 317/134 |
| 4,004,228 | 1/1977 | Mullett | 455/95 |
| 4,004,273 | 1/1977 | Kalogerson | 340/64 |
| 4,041,394 | 8/1977 | Pate | 455/100 |
| 4,100,534 | 7/1978 | Shifflet, Jr. | 340/149 |
| 4,101,871 | 7/1978 | Oliveira, II | 455/95 |
| 4,114,147 | 9/1978 | Hile | 340/528 |
| 4,129,855 | 12/1978 | Rodrian | 340/152 |
| 4,137,985 | 2/1979 | Winchell | 180/114 |
| 4,142,097 | 2/1979 | Ulch | 235/382 |
| 4,143,368 | 3/1979 | Route et al. | 340/543 |
| 4,148,092 | 4/1979 | Martin | 361/172 |
| 4,160,240 | 7/1979 | Partipilo | 340/311 |
| 4,189,712 | 2/1980 | Lemelson | 340/149 |
| 4,196,347 | 4/1980 | Hadley | 455/603 |

(List continued on next page.)

FOREIGN PATENT DOCUMENTS 2634303 2/1978 Fed. Rep. of Germany .
60-119874 6/1985 Japan .

OTHER PUBLICATIONS

Guenther Wahl, "Frech-Verlag", Microspione, pp. 17–18, Stuttgart 1984.

Primary Examiner—Donald J. Yusko
Assistant Examiner—Edwin C. Holloway, III
Attorney, Agent, or Firm—Foley & Lardner

[57] ABSTRACT

A radio signal transmitter for use in an automotive keyless entry system, is resistant to damage even when subject bending stresses. The radio code transmitter has a thin housing. A substrate for a transmitter circuit is housed within the thin internal space of the housing. A plurality of circuit components making up the transmitter circuit are mounted on the substrate. The circuit components are arranged in such a manner that relatively large components are near the edges of the substrate and relatively small components are nearer the center of the substrate.

6 Claims, 5 Drawing Sheets

U.S. PATENT DOCUMENTS

| | | | |
|---|---|---|---|
| 4,205,300 | 5/1980 | Ho et al. | 340/65 |
| 4,205,325 | 5/1980 | Haygood et al. | 340/147 |
| 4,206,491 | 6/1980 | Ligman et al. | 361/172 |
| 4,222,088 | 9/1980 | Burton | 361/172 |
| 4,223,296 | 9/1980 | Kim et al. | 340/52 |
| 4,232,354 | 11/1980 | Mueller et al. | 361/172 |
| 4,233,642 | 11/1980 | Ellsberg | 361/172 |
| 4,236,068 | 11/1980 | Walton | 235/380 |
| 4,240,516 | 12/1980 | Henderson et al. | 180/289 |
| 4,249,161 | 2/1981 | Mohnhaupt | 340/52 |
| 4,249,245 | 2/1981 | Nakanishi et al. | 364/710 |
| 4,291,237 | 9/1981 | Kitano | 307/10 |
| 4,309,674 | 1/1982 | Owen | 332/18 |
| 4,309,766 | 1/1982 | Lechner et al. | 370/112 |
| 4,317,157 | 2/1982 | Eckloff | 361/172 |
| 4,327,255 | 4/1982 | Suszylo | 179/90 |
| 4,332,305 | 6/1982 | Kocolowski | 180/271 |
| 4,353,064 | 10/1982 | Stamm | 340/825.31 |
| 4,354,189 | 10/1982 | Lemelson | 340/825.31 |
| 4,388,524 | 6/1983 | Walton | 235/380 |
| 4,418,416 | 11/1983 | Lese et al. | 375/5 |
| 4,447,808 | 5/1984 | Marcus | 340/696 |
| 4,450,431 | 5/1984 | Hochstein | 340/58 |
| 4,471,343 | 9/1984 | Lemelson | 340/571 |
| 4,473,825 | 9/1984 | Walton | 340/825.54 |
| 4,477,806 | 10/1984 | Mochida et al. | 340/825.32 |
| 4,479,255 | 10/1984 | Geesen et al. | 455/246 |
| 4,486,806 | 12/1984 | Mochida et al. | 361/172 |
| 4,506,148 | 3/1985 | Berthold et al. | 235/382 |
| 4,509,093 | 4/1985 | Stellberger | 361/172 |
| 4,511,946 | 4/1985 | McGahan | 361/172 |
| 4,535,333 | 8/1985 | Twardowski | 340/825.69 |
| 4,550,444 | 10/1985 | Uebel | 455/41 |
| 4,554,542 | 11/1985 | Dolikian | 340/825.76 |
| 4,595,902 | 6/1986 | Proske et al. | 340/63 |
| 4,598,275 | 7/1986 | Ross et al. | 340/573 |
| 4,619,002 | 10/1986 | Thro | 455/226 |
| 4,630,044 | 12/1986 | Polzer | 340/825.72 |
| 4,639,585 | 1/1987 | Haghiri-Tehrani et al. | 235/487 |
| 4,670,746 | 6/1987 | Taniguchi et al. | 340/825.31 |
| 4,672,375 | 6/1987 | Mochida et al. | 340/825.31 |
| 4,680,675 | 7/1987 | Sato | 361/397 |
| 4,682,017 | 7/1987 | Nakahara et al. | 235/487 |
| 4,688,036 | 8/1987 | Hirano et al. | 340/825.69 |
| 4,703,714 | 11/1987 | Bajka et al. | 118/57 |
| 4,719,460 | 1/1988 | Takeuchi et al. | 340/825.31 | ffi# POCKET-PORTABLE RADIO CODE SIGNAL TRANSMITTER FOR AUTOMOTIVE KEYLESS ENTRY SYSTEM This application is a continuation of application Ser. No. 06/895,372, filed Aug. 11, 1986 now abandoned.

BACKGROUND OF THE INVENTION

The present invention relates generally to a radio signal transmitter for generating a radio signal indicative of a preset code for operating automotive vehicle devices, such as a door lock mechanism, a trunk lid lock opener and so forth. More specifically, the invention relates to a compact radio signal transmitter equivalent in size to a bankcard, creditcard and the like.

A recently proposed keyless entry system for an automotive vehicle does not require mechanical key operation or manual entry of a preset code for operating a door lock mechanism for locking and unlocking the door, a trunk lid opener for opening the trunk lid, and so forth. In this keyless entry system, a bank- or credit-card-type radio signal transmitter has been employed to generate a radio signal indicative of a preset code. The preset-code-indicative radio signal is sent to a controller mounted on the vehicle which operates the door lock mechanism, the trunk lid opener and so forth when the code in the radio signal coincides with the preset code in the controller.

The radio signal transmitter of this type is adapted to be carried in clothing pockets. A radio signal transmitter carried this way will be subject to bending stresses as the user moves naturally. Since the radio signal transmitter contains a plurality of circuit elements mounted on a relatively flexible circuit board within a small, thin transmitter housing, such bending stresses can easily damage the circuit board itself or the circuit elements on the circuit board.

SUMMARY OF THE INVENTION

Therefore, it is an object of the present invention to provide a radio signal transmitter for use in an automotive keyless entry system, which is resistant to damage even when subject to bending stresses.

In order to accomplish the aforementioned and other objects, a radio code transmitter for an automotive keyless entry system, according to the invention, has a thin housing. A substrate for a transmitter circuit is housed within the thin internal space of the housing. A plurality of circuit components making up the transmitter circuit are mounted on the substrate. The circuit components are arranged in such a manner that relatively large components are near the edges of the substrate and relatively small components are nearer the center of the substrate.

As can easily be appreciated, when the radio code signal transmitter is subjected to bending forces and is thus bent, the magnitude of bending deformation near the center will be greater than at the edges. Therefore, by arranging the relatively large components near the edges of the substrate, they will be subjected to less bending. This reduces the possibility of damage or loosening of the relatively large components. On the other hand, since the relatively small components are naturally less susceptible to bending of the housing and the substrate, they have less possibility of being damaged or loosened by bending of the substrate. Therefore, small components can be placed near the center of the substrate where deformation is greater than near the edges.

In cases where, the housing of the radio code signal transmitter is in the form of a rectangular box, the smaller components will be arranged with their longitudinal axes lying transverse to the longitudinal axis of the housing. This further reduces the influence of bending on the smaller components and thus reduces the possibility of damage thereto.

According to one aspect of the invention, a pocket-portable radio signal transmitter comprises a substantially thin transmitter housing defining therein a thin space, an elastically deformable substrate housed within the thin space in the transmitter housing, first relatively large transmitter circuit components fixedly mounted on the substrate, the first components being arranged adjacent the edges of the substrate, and second relatively small transmitter circuit components fixedly mounted on the substrate, the second components being arranged near the center of the substrate.

The transmitter housing is made of a synthetic resin and is elastically deformable in response to bending forces exerted thereupon. The first components are arranged adjacent corners of the substrate. The second components are oriented on the substrate so that the longitudinal axes thereof lie substantially perpendicular to the axis along which maximum bending of the substrate occurs.

In practice, the first components comprise a battery, a CPU package and an IC package. Preferably, the battery and CPU package are disposed in corners of the substrate. In the other hand, the second components comprises resistors and transistors.

DESCRIPTION OF THE PREFERRED EMBODIMENT

Before disclosing the detailed construction of the preferred embodiment of a radio code signal transmitter according to the present invention, the preferred embodiment of a keyless entry system and operation thereof will be described in order to facilitate a better understanding of the present invention.

Figure 1:
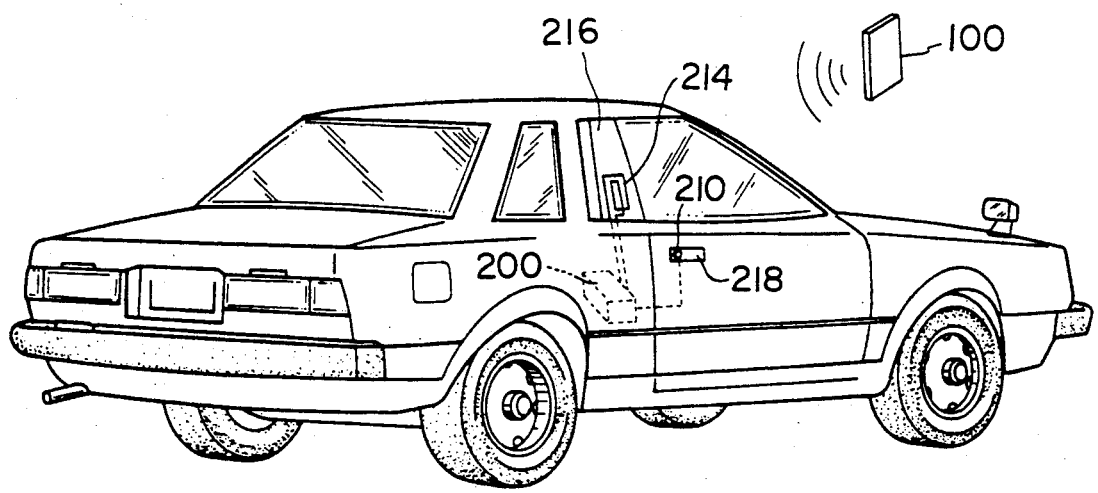
FIG. 1 is a perspective view of an automotive vehicle, in which the preferred embodiment of a keyless entry system according to the present invention is installed.

Referring now to the drawings, particularly to FIG. 1, the preferred embodiment of the keyless entry system according to the invention, generally comprises a radio code signal transmitter 100 and a controller 200. The radio code signal transmitter 100 is of generally thin bank- or credit-card-like configuration and is equivalent in size to a bank or credit card. On the other hand, the controller 200 is mounted at an appropriate position within the passenger compartment of an automotive vehicle.

Figure 2:
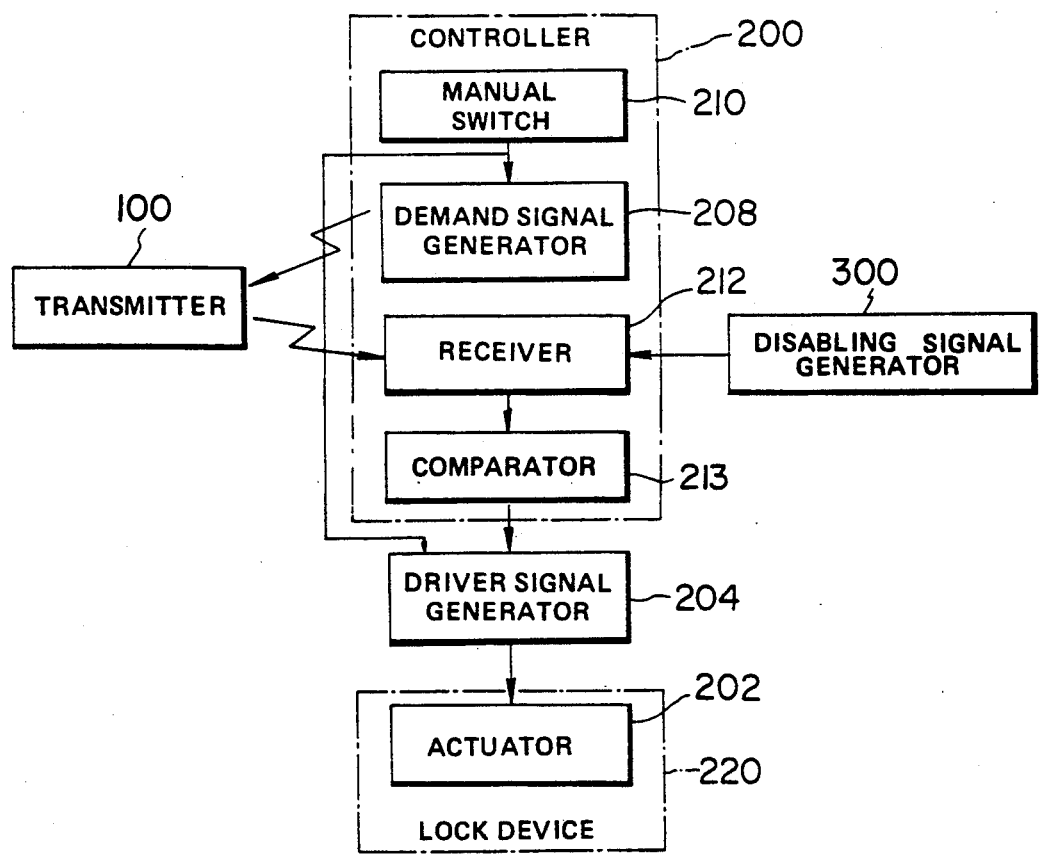
FIG. 2 is a schematic block diagram of the general lay-out of the keyless entry system for automotive vehicle devices, such as a door lock mechanism, according to the invention.

As shown in FIGS. 1 and 2, the controller 200 is connected via a driver signal generator 204 to actuators 202 for vehicle devices such as a door lock device, a trunk lid lock device, a glove box lid lock and a steering lock device. The controller 200 is also connected to a disable signal generator 300 which can produce a disable signal to selectably disable the controller. The disable signal generator 300 responds to predetermined conditions by producing the disable signal.

In the shown first embodiment, the disable signal generator 300 detects when an ignition switch is in a position other than the OFF position. For instance, the disable signal generator 300 outputs the disable signal when the ignition switch is in the ACC position, wherein electric power is supplied to electrical accessories in the vehicle, or the IGN position, wherein electric power is supplied to an engine ignition system and to the electrical accessories, or the START position wherein electric power is applied to a starter motor (not shown).

The controller 200 includes a radio demand signal SD generator 208 which sends a radio demand signal SD to the radio code signal transmitter 100 to activate the latter. The radio demand signal SD generator 208 is connected to one or more manual switches 210 which are placed on the external surface of the vehicle so as to be accessible from outside the vehicle. The radio demand signal SD generator 208 produces the radio demand signal SD when one of the manual switches 210 is depressed.

Figure 3:
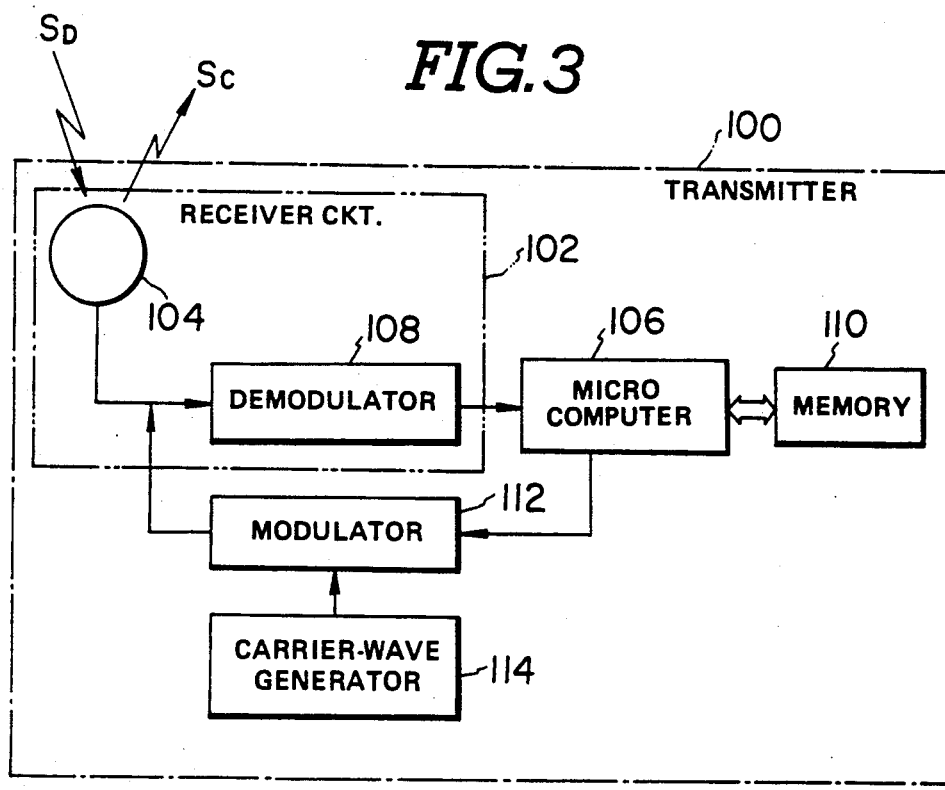
FIG. 3 is a block diagram of a radio code signal transmitter in the preferred embodiment of the keyless entry system of FIG. 2.

As shown in FIG. 3, the radio code signal transmitter 100 includes a receiver circuit 102 for receiving the radio demand signal SD from the controller. The radio code signal transmitter 100 becomes active when the receiving circuit 102 receives the radio demand signal SD to produce a radio code signal SC which is indicative of a preset specific code. The preset code of the portable radio code signal transmitter 100 differs from that of the radio demand signal SD generator 208 so that the controller 200 can recognize when the radio code signal transmitter 100 is responding.

The radio code signal transmitter 100 continuously transmits the radio code signal SC to the controller for as long as it remains active. The radio code signal SC is received by a receiver 212 in the controller 200. The controller 200 has a comparator 213 to compare the received code with a specific preset code. When the received code matches the code preset as compared in the comparator 213, the controller 200 sends a control signal SL to the driver circuit generator 204. The driver signal generator 204 in turn sends a drive signal to one of the actuators 202 corresponding to the manual switch 210 operated. The actuator 202 is activated by the driver signal from the driver signal generator 204 to operate the corresponding vehicle device.

It should be appreciated that, since the vehicle devices to be operated by the first embodiment of the keyless entry system are two-state locking devices for locking and unlocking vehicle doors, the trunk lid, the glove box lid, the steering column and so forth, the actuators 202 actuate the vehicle devices from the current position to the opposite position in response to the driver signal. For instance, when the vehicle device is in the locked position, the actuator unlocks the vehicle device in response to the driver signal. On the other hand, when the driver signal is sent to the actuator of a vehicle device which is currently unlocked, that vehicle device is then locked.

The radio code signal transmitter 100 includes a transmitter/receiver antenna 104. In addition, a loop antenna 214 is built into an appropriate position of the vehicle, such as one of the windows 216 of the vehicle or in a side mirror. The loop antenna 214 transmits the radio demand signal SD to and receives the radio code signal SC from the radio code signal transmitter 100. As shown in FIG. 2, the manual switches 210 are mounted on an escutcheon 218 of an outside door handle for operation from outside the vehicle.

FIG. 3 shows the circuit structure of the radio code signal transmitter 100. A microprocessor 106 is connected to the antenna 104 via a demodulator 108 which demodulates the received radio demand signal SD. The microprocessor 106 includes a memory 110 storing the preset code. In response to the radio demand signal SD, the microprocessor 106 reads the preset code out to a modulator 112. The modulator 112 is, in turn, connected to a carrier-wave generator 114 to receive a carrier wave. The modulator 112 modulates the carrier-wave with the code-indicative signal from the microprocessor 106 to produce the final radio code signal SC.

Figure 6:
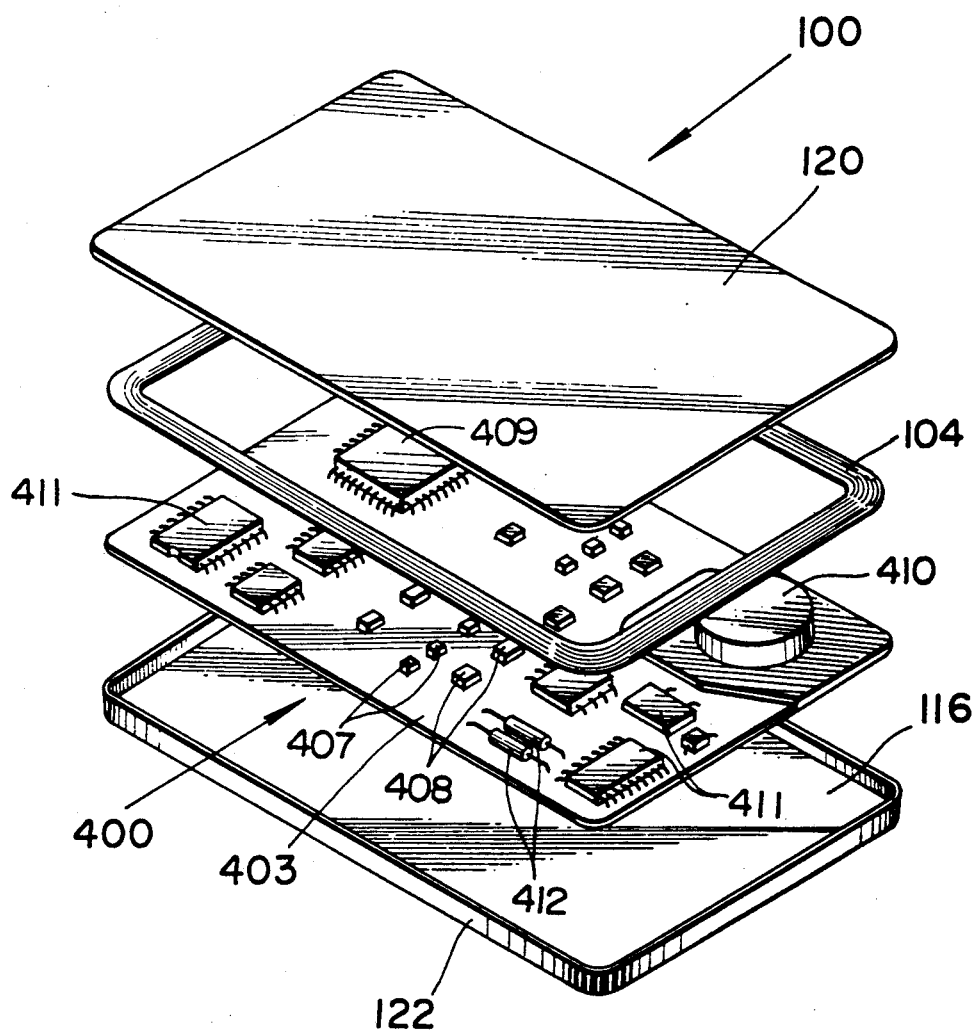
FIG. 6 is an exploded perspective view of the preferred embodiment of the radio code signal transmitter according to the invention.

In the preferred embodiment, the antenna 104 of the radio code signal transmitter 100 is built into the transmitter circuit board or on the surface of a transmitter housing 116 (shown in FIG. 6). The casing 116 is the size of a name card and thin enough to carry in a shirt pocket. The transmitter 100 uses a long-life, compact battery, such as a mercury battery, as a power source.

Figure 4:
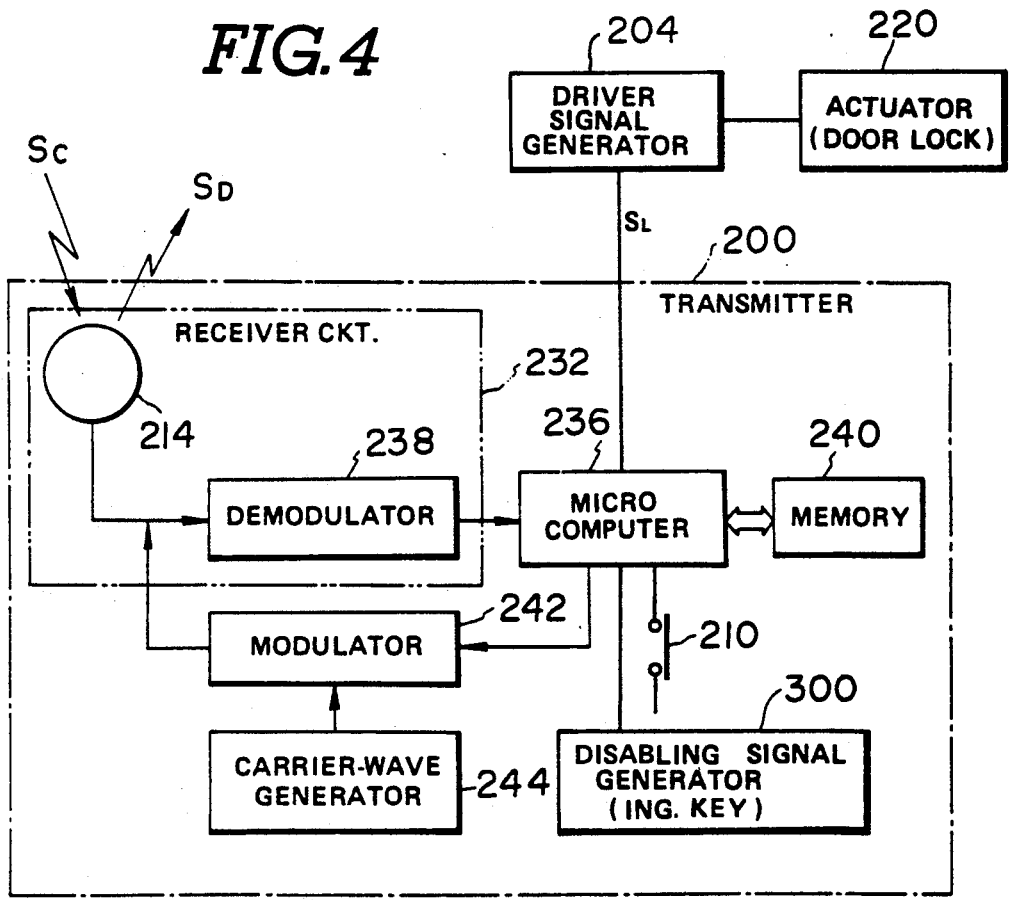
FIG. 4 is a block diagram of a controller in the preferred embodiment of the keyless entry system of FIG. 2.

FIG. 4 shows the practical circuit structure of the controller 200 which has been disclosed functionally with reference to FIG. 2. As seen from FIG. 4, the controller 200 generally comprises a microprocessor 236 which is connected to the antenna 214 through a demodulator 238, which together constitute a receiver circuit 232 receiving the radio code signal SC from the radio code signal transmitter 100. Also, the microprocessor 236 is connected for output to the antenna 214 through a modulator 242. The modulator 242 is also connected to a carrier-wave generator 244 to receive therefrom a carrier wave of a predetermined frequency. The modulator 242 modulates the carrier wave in accordance with a demand indicative signal from the microprocessor and transmits the resulting radio demand signal through the antenna 214.

The microprocessor 236 has internal or external memory 240 such as a programable ROM or the like. Preset codes, one of which corresponds to the demand for activating the radio code signal transmitter 100 and the other of which corresponds to the preset code in the radio code signal transmitter, are stored in the memory 240.

As set forth above, the microprocessor 236 is also connected to a disabling signal generator 300, such as the ignition switch. The microprocessor 236 is disabled in response to the disabling signal from the disabling signal generator when a predetermined disabling factor is detected. Unless disabled by the disabling signal, the microprocessor 236 receives the radio code signal from the radio code signal transmitter 100, compares the received code with the preset code in the memory 240, and outputs the control signal to a driver signal generator 204 for operating the actuator 220.

Figure 5A:
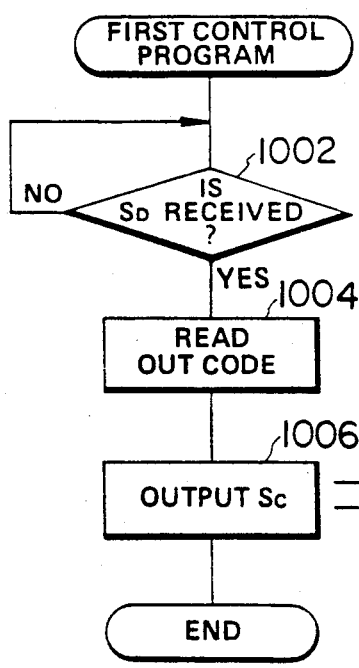
FIGS. 5(A) and 5(B) are flowcharts of the operation of the transmitter of FIG. 3 and the controller of FIG. 4.

The operation of the aforementioned embodiment the keyless entry system set forth above will be described in more detail with reference to FIGS. 5(A) and 5(B). The microprocessor 106 of the radio code signal transmitter 100 repeatedly executes the first control program illustrated in FIG. 5(A). In the first control program, the microprocessor 106 checks for receipt of the radio demand signal SD from the controller at a step 1002. The step 1002 is repeated until the radio demand signal SD is received. In other words, the radio code signal transmitter 100 normally remains in a stand-by state, waiting to produce the radio code signal SC in response to the radio demand signal SD.

When the radio demand signal SD is detected at the step 1002, the preset code is read from the memory 110 at a step 1004. The microprocessor 106 then outputs the preset code-indicative signal to the modulator 112 which, in turn, outputs the radio code signal SC in step 1006. Control then returns to the stand-by step 1002.

It should be noted that the radio code signal SC is transmitted from the modulator to the controller 200 for a given period of time and terminates when the given period of time expires. The given period of time during which the radio code signal SC is transmitted is so chosen that the controller 200 can activate the actuator 202 designated by the operated manual switch 210 before expiration of that period. In addition, the preset code stored in the memory 110 is preferably a binary code, such as an 8-bit serial datum. This binary code rides on the carrier wave as modulated by the modulator to form the radio code signal SC.

Figure 5B:
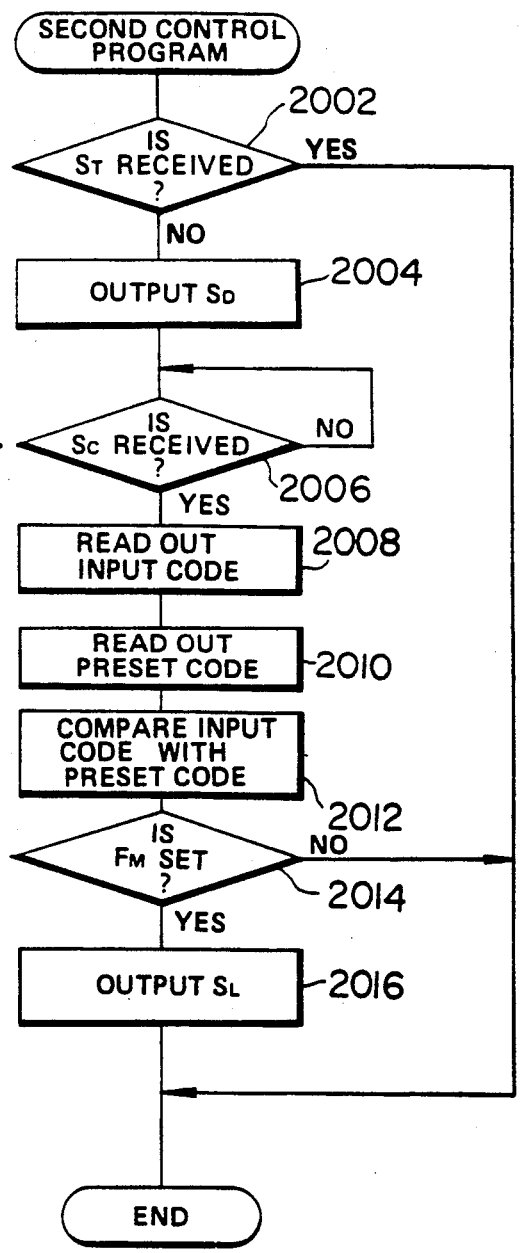

FIG. 5(B) is flowchart for the controller 200. At the initial stage of the second control program of FIG. 5(B), the microprocessor 236 checks whether disabling signal $S_I$ is input or not at a step 2002. If the disabling signal $S_I$ is not detected when checked at the step 2002 control passes to a step 2004, in which the modulator 242 is activated to send a radio demand signal SD to the radio code signal transmitter 100 to activate the latter. Thereafter, the controller 200 enters a stand-by state, waiting for the radio code signal SC. Specifically, a step 2006 is repeated for a fixed period of time as a loop until the radio code signal SC is received. After the radio code signal SC is input via the antenna 214 and the demodulator 238, the received code in the radio code signal SC is read out at a step 2008. The preset code of the controller 200 is then read out from the memory 240, at a step 2010. The input code and the preset code read out in steps 2008 and 2010 are compared at a step 2012. If the codes match, a matching flag FM is set at the step 2012. The matching flag FM is checked at a step 2014. If the matching flag FM is not set, the program ends. On the other hand, if the matching flag FM is set when checked at the step 2014, then the control signal SL is sent to the driver signal generator at a step 2016.

In this embodiment as set forth above, since the radio code signal SC is output only when the demand signal SD is input from the controller, consumption of electric power of the battery in the transmitter is significantly reduced in comparison with system which might employ constant transmission of the radio code signal SC. Thus, the life-time of the battery of the transmitter is prolonged even though electric power is constantly supplied to the microprocessor to hold same in a standby state. It should be appreciated that the electric power needed to power the microprocessor is substantially smaller than that consumed in transmitting the radio code signal SC. Therefore, constant power supply to the microprocessor will not significantly affect the life-time of the battery.

It should be also appreciated that the control signal $S_L$ serves to actuate the associated vehicle device to the desired position. For instance, when the vehicle device to be operated is the door lock device, the position of the door lock device is reversed between its locked and unlocked positions each time the control signal $S_L$ is generated. Therefore, in the step 2016, the control signal $S_L$ for reversing the door lock device position is output when the manual switch 210 associated with the door lock device is manually depressed.

Figure 7:
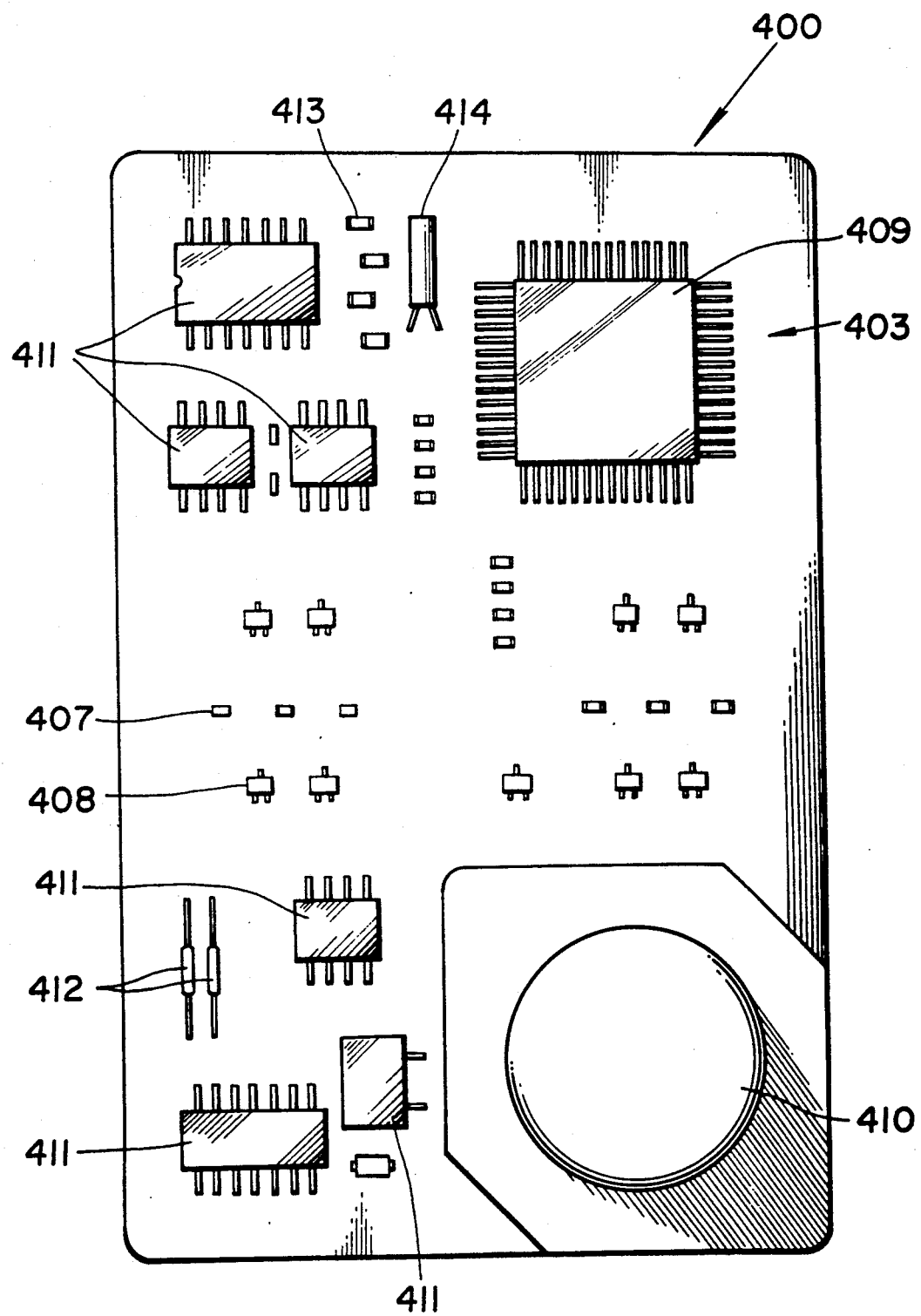
FIG. 7 is an enlarged plan view of a circuit board in the preferred embodiment of the radio code signal transmitter of FIG. 6.

FIGS. 6 and 7 show the preferred embodiment of the radio code signal transmitter according to the present invention. As set forth above, the radio code signal transmitter 100 is of bank- or credit-card-like configuration and size so as to fit in a clothing pocket.

The radio code signal transmitter 100 has a thin, box-shaped housing which comprises an upwardly opened housing body 122 and a closure 120 which are both made of a synthetic resin. The closure 120 is designed to seal the upward opening of the housing body 122 in order to define a thin internal space. A transmitter circuit board 400 and the loop antenna 104 are housed within the internal space of the transmitter housing.

The transmitter circuit board 400 comprises a flexible substrate 403. The substrate 403 is of substantially the same size and shape as the internal space of the transmitter housing. As shown in FIG. 7, a battery 410, such as a lithium long-life battery, a CPU package 409 (corresponding to microprocessor 106), IC packages 411, resistors 407, transistors 408, diodes 412, a crystal oscillator 414 and other circuit components are mounted on the substrate 403. As will be appreciated from FIG. 7, relatively large components, such as the battery 410, the CPU package, IC packages, diodes 412 are arranged in areas near the longitudinal ends of the substrate 403. On the other hand, relatively small components, such as resistors 407 and transistors 408 are arranged near the longitudinal center of the substrate 403. Furthermore, the smaller components are oriented on the substrate 403 with their longitudinal axes perpendicular to the longitudinal axis of the substrate.

It is especially important among the larger components for the CPU package 409, the battery 410, the IC packages to be arranged near the corners of the substrate 403.

With this arrangement, the larger components, such as the CPU package 409, the battery 410, and IC packages 411, which are more susceptible to the influence of bending of the transmitter housing, can be positioned at points on the substrate where the bending magnitude is minimal. On the other hand, the smaller components, such as the resistors 407, the transistors 408 and so forth, which are less susceptible to the influence of bending of the substrate 403 are arranged near the longitudinal center of the substrate, which tends to be deformed the most.

As will be appreciated from FIG. 6, the loop antenna 104 extends along the inner edges of the transmitter housing and is preferably bonded or fixed to the inner vertical edge of the transmitter housing by means of adhesive, double sided adhesive tape or the like.

With the aforementioned arrangement, the preferred embodiment of the radio code signal transmitter 100 according to the present invention exhibits better resistance to bending and thus is more reliable for long-term use, even when it is carried in the hip pocket of trousers.

Therefore, the present invention fulfills all of the objects and advantages sought therefor.

What is claimed is:

1. A pocket-portable transmitter for an automotive keyless entry system, said transmitter comprising:
   - a substantially box-shaped housing including first parallel edge portions having a given length and second parallel edge portions having a length less than the length of said first parallel edge portions;
   - a flexible substrate within said housing;
   - a first group of relatively large circuit components, said first group of relatively large circuit components including a microprocessor;
   - a second group of relatively small circuit components, said small circuit components located on central portions of said substrate, longitudinal axes of said small components being aligned perpendicular to a longitudinal axis of said substrate; and
   - an antenna mounted on a peripheral edge wall portion of said housing, said wall portion being perpendicular to said substrate; and wherein
   - at least one of said relatively large circuit components is located on said substrate adjacent to one of said second parallel edge portions.

2. A transmitter as set forth in claim 1, wherein said housing is made of a synthetic resin and is elastically deformable in response to bending forces exerted on said housing.

3. A transmitter as set forth in claim 1, wherein said relatively large circuit components are arranged on adjacent corners of said substrate.

4. A transmitter as set forth in claim 1, wherein said first group of relatively large circuit components includes a battery.

5. A transmitter as set forth in claim 4, wherein said battery and said microprocessor are located in corners of said substrate.

6. A transmitter as set forth in claim 5, wherein said second group of relatively small circuit components includes a resistor and a transistor.

* * * * *